(12) United States Patent
Chang et al.

(10) Patent No.: US 9,851,760 B2
(45) Date of Patent: Dec. 26, 2017

(54) TOUCH PANEL AND TOUCH ELECTRONIC DEVICE

(71) Applicant: TPK Touch Systems (Xiamen) Inc., Xiamen (CN)

(72) Inventors: Chen-Hsin Chang, Taoyuan (TW); Pu-Hsin Chang, Taichung (TW); Jui-Hsing Li, Taoyuan (TW); Fucheng Chen, Xiamen (CN); Pudi Hong, Xiamen (CN)

(73) Assignee: TPK Touch Systems (XIAMEN) Inc, Xiamen (CN)

( * ) Notice: Subject to any disclaimer, the term of this patent is extended or adjusted under 35 U.S.C. 154(b) by 123 days.

(21) Appl. No.: 14/736,268

(22) Filed: Jun. 11, 2015

(65) Prior Publication Data
US 2015/0362960 A1    Dec. 17, 2015

(30) Foreign Application Priority Data
Jun. 13, 2014  (CN) .......................... 2014 1 0282516

(51) Int. Cl.
*G06F 3/041* (2006.01)
*G06F 1/16* (2006.01)
*G06F 3/044* (2006.01)

(52) U.S. Cl.
CPC .......... *G06F 1/1692* (2013.01); *G06F 1/1643* (2013.01); *G06F 3/044* (2013.01); *G06F 2203/04102* (2013.01)

(58) Field of Classification Search
CPC ...... G06F 3/044; G06F 3/0412; G06F 1/1643; G06F 2203/04102; G06F 1/1652
USPC ......................................................... 345/173
See application file for complete search history.

(56) References Cited

U.S. PATENT DOCUMENTS

| 9,025,089 | B2 * | 5/2015 | Lee | G06F 3/016 345/173 |
|---|---|---|---|---|
| 2012/0268402 | A1 * | 10/2012 | Wang | G06F 3/041 345/173 |
| 2013/0002583 | A1 * | 1/2013 | Jin | G06F 1/1637 345/173 |
| 2013/0032414 | A1 * | 2/2013 | Yilmaz | G06F 1/169 178/18.06 |
| 2013/0315419 | A1 * | 11/2013 | Chien | H03G 7/00 381/98 |
| 2014/0160641 | A1 * | 6/2014 | Chuang | G06F 3/044 361/679.01 |
| 2014/0295063 | A1 * | 10/2014 | Petcavich | B41F 5/24 427/79 |

(Continued)

*Primary Examiner* — Yuzhen Shen
(74) *Attorney, Agent, or Firm* — Paul Bendemire (57) ABSTRACT

A touch panel including a flexible substrate, first and second electrode patterns and a trace structure is mounted inside a casing unit with a main casing and a side frame connected to a periphery of the main casing and provided with a key icon. The substrate is disposed in the casing unit and includes first and second areas respectively corresponding to the main casing and side frame. The first electrode pattern is formed on the substrate at the first area. The second electrode pattern is formed on the substrate at the second area corresponding to the key icon. The trace structure is formed on the substrate with contacts and traces connected among the first electrode pattern, the second electrode pattern and the contacts.

14 Claims, 10 Drawing Sheets

(56) References Cited

U.S. PATENT DOCUMENTS

| | | | |
|---|---|---|---|
| 2015/0009128 A1* | 1/2015 | Matsumoto | G06F 3/03 345/156 |
| 2015/0103023 A1* | 4/2015 | Iwaki | G06F 3/0488 345/173 |
| 2016/0170523 A1* | 6/2016 | Park | G06F 3/044 345/174 |

* cited by examiner

TOUCH PANEL AND TOUCH ELECTRONIC DEVICE

BACKGROUND OF THE INVENTION

This application claims priority to Chinese Application Serial Number 201410282516.X, filed on June 13, which is herein incorporated by reference.

FIELD OF THE INVENTION

This disclosure relates to touch panels and touch electronic devices, and more particularly to touch panels and touch electronic devices that achieve touch functions on a side frame.

RELATED ART OF THE INVENTION

With the rapid advancement and application of information technology, wireless mobile communication and information appliances, applications of touch panels or touch screens have gradually become common in electronic devices, and therefore touch electronic devices have grown in popularity.

A conventional touch electronic device generally has a display zone and a periphery zone, where the display zone is designed with touch function to sense user touch inputs, while the periphery zone provides placements of touch keys, such as a return key, a main page key, a menu key, etc. The touch keys occupy a certain surface area of the periphery zone. Under the premise that the size of the touch electronic device remains constant, the surface area of the display zone is thus limited and narrow frame design is thus difficult to realize.

SUMMARY OF THE INVENTION

An object of this disclosure is to provide a touch panel that can realize touch functionality at a side frame thereof so as to maximize a touch display portion thereof.

A touch panel mounted inside a casing unit. The casing unit includes a main casing and a side frame connected to a periphery of the main casing. The side frame is provided with at least one key icon. The touch panel includes a flexible substrate, a first electrode pattern, at least one second electrode pattern and a trace structure.

The flexible substrate is correspondingly disposed at an inner surface of the casing unit, and includes a first area that corresponds to the main casing and a second area that corresponds to the side frame.

The first electrode pattern is formed on a surface of the flexible substrate and located at the first area.

The at least one second electrode pattern is formed on the surface of the flexible substrate and located at the second area. The second electrode pattern corresponds to the at least one key icon.

The trace structure is formed on the surface of the flexible substrate, and includes a plurality of contacts, and a plurality of traces connected among the first electrode pattern, the second electrode pattern and the contacts.

Another object of this disclosure is to provide a touch electronic device that includes the aforesaid casing unit and touch panel.

BRIEF DESCRIPTION OF THE DRAWINGS

Other features and advantages of the present disclosure will become apparent in the following detailed description of the embodiments with reference to the accompanying drawings, of which.

DETAILED DESCRIPTION OF THE INVENTION

Before the present disclosure is described in greater detail, it should be noted that like elements are denoted by the same reference numerals throughout the disclosure.

Figure 1:
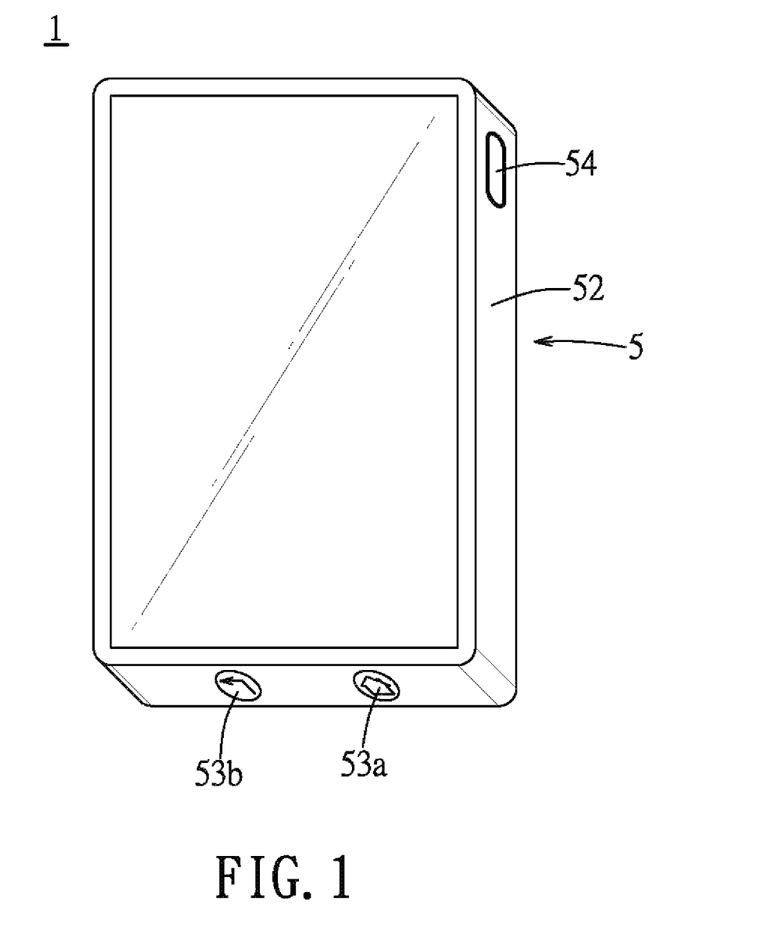
FIG. 1 is a perspective view, illustrating a touch electronic device according to a first embodiment of this disclosure, where a touch display portion is maximized.
Figure 2:
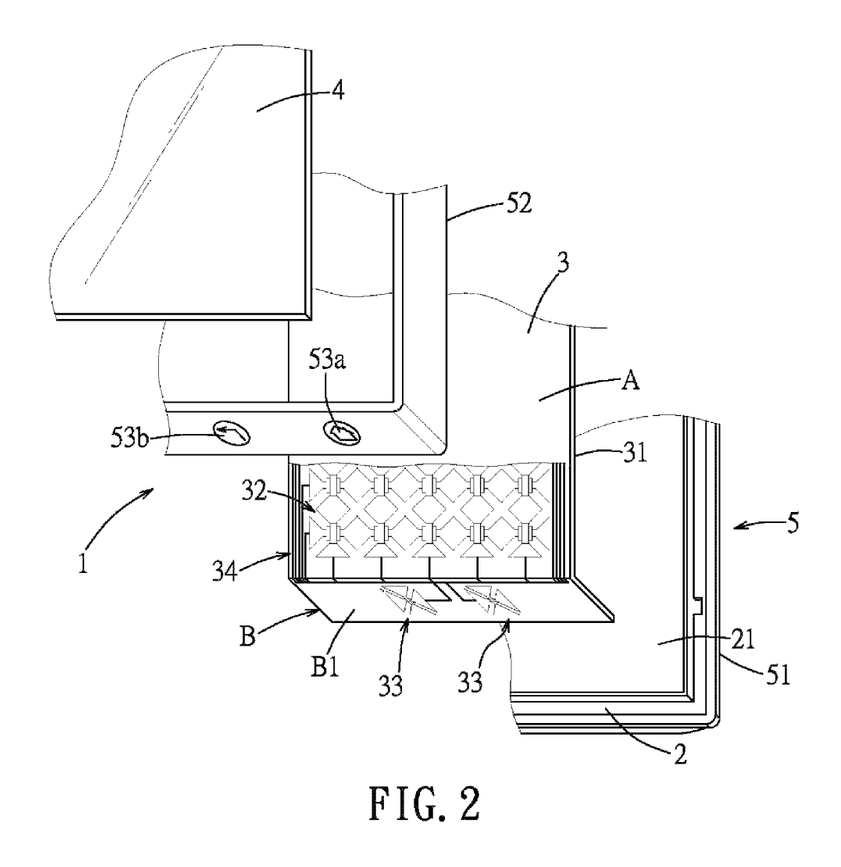
FIG. 2 is a fragmentary exploded perspective view, illustrating internal configuration of the first embodiment.
Figure 3:
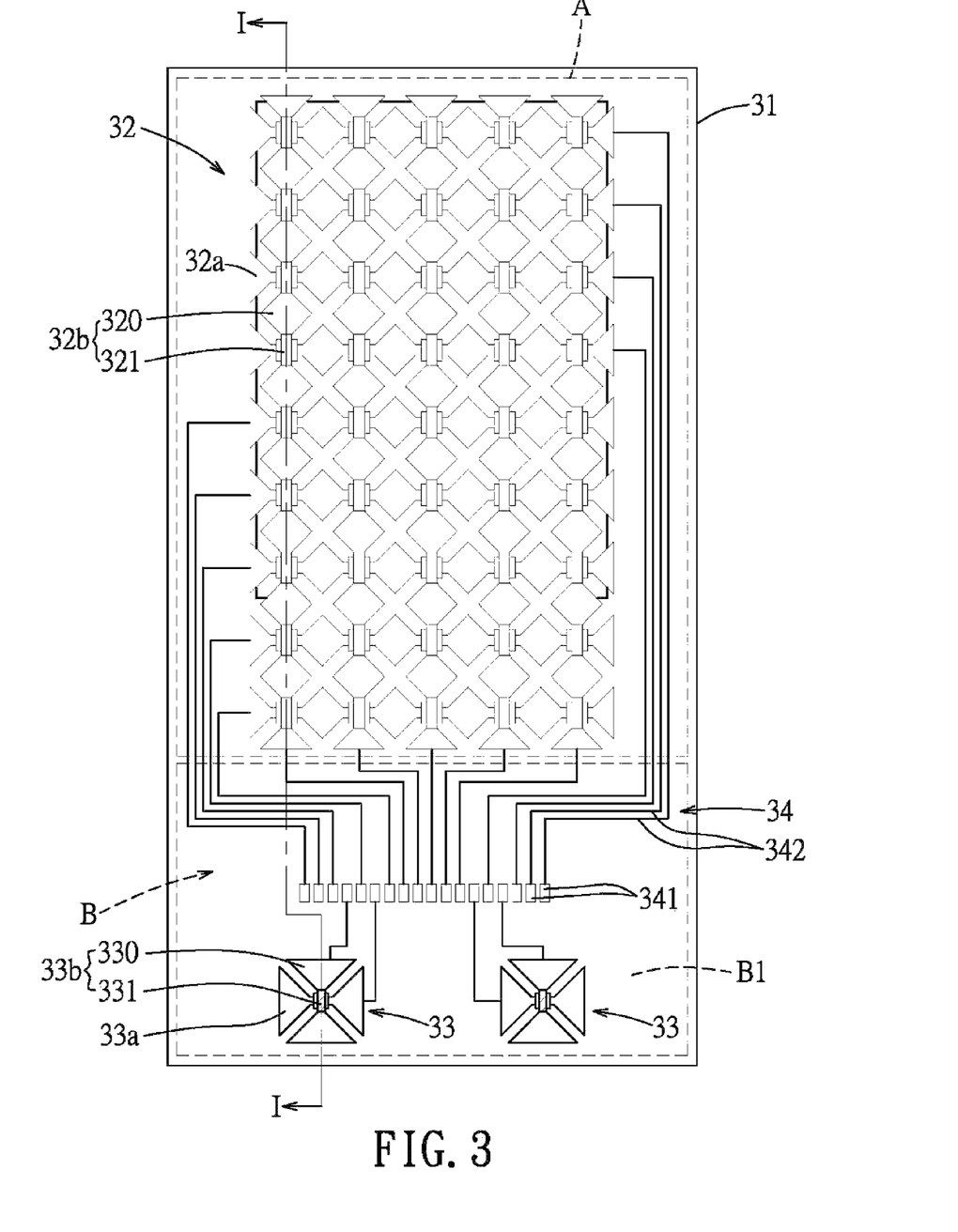
FIG. 3 is a top view, illustrating a touch panel of the first embodiment when expanded and laid flat.

Referring to FIGS. 1, 2 and 3, FIG. 1 is a perspective view to illustrate a touch display portion being maximized in a touch electronic device in accordance with various embodiments of this disclosure; FIG. 2 is a fragmentary exploded perspective view to illustrate internal configuration; and FIG. 3 is a top view to illustrate a touch panel when expanded and laid, flat. The touch electronic device 1 includes a display panel 2, a touch panel 3, a transparent protective plate 4 and a casing unit 5. The touch panel 3 and the display panel 2 are mounted in the casing unit 5, and the touch panel 3 is disposed between the display panel 2 and the transparent protective plate 4.

Referring to FIG. 2, the casing unit 5 includes a main casing 51 and a side frame 52 connected to a periphery of the main casing 51 to form an angle (e.g., 90 degrees). The main casing 51 and the side frame 52 may be mutually independent components, or may be designed to be integrally formed. The side frame 52 is provided with a plurality of key icons 53a, 53b.

In some embodiments, the display panel 2 is a liquid crystal module (LCM). The display panel 2 is installed inside the casing unit 5. The display panel 2 further includes a display side 21, which is distal from the main casing 51 of the casing unit 5. In other embodiments, the display panel 2 may also be a light emitting diode display module or an organic light emitting diode (OLED) display module. This disclosure is not limited to any specific type or model in this respect.

The touch panel 3 is installed inside the casing unit 5, is proximate to the display side 21 of the display panel 2, and is adhered to the display panel 2 via a bonding layer (not shown). The touch panel 3 can be applied to electronic devices such as calculators, cell phones, cameras, audio equipment, in-car equipment, etc.

Referring to FIG. 3, the touch panel 3 of this embodiment includes a flexible substrate 31. The flexible substrate 31 is for example, a flexible transparent thin film. The flexible substrate may be made from a flexible material, such as a plastic material. The plastic material may be, for example, polyethylene, polypropylene, polystyrene, polymethylmethacrylate, polyvinyl chloride, nylon, polycarbonate, polyurethane, polytetrafluoroethylene, polyethylene terephthalate, etc. In other embodiments, the flexible substrate 31 may have undergone at least one of the following surface processings: reinforcement, anti-glare and anti-bacterial. The flexible substrate 31 includes a first area A corresponding to the main casing 51, and a second area B corresponding to the side frame 52. The second area B corresponding to the side frame 52 includes a plurality of sub-areas, respectively corresponding to long sides and short sides of the side frame 52. The second area B is exemplified to include a first sub-area B1 for illustration purposes in this embodiment. Although the first sub-area B1 is shown to be located at the short side as an example in the drawing, it should be appreciated that the same may be designed to be at the long side.

The touch panel 3 further includes a first electrode pattern 32 formed on one surface of the flexible substrate 31 and correspondingly located at the first area A; at least one second electrode pattern 33 formed at one surface of the flexible substrate 31 and correspondingly located at the first sub-area B1; and a trace structure 34 formed on one surface of the flexible substrate 31 and correspondingly located between the first area A and the first sub-area B1. In some embodiments, the first electrode pattern 32 and the second electrode pattern 33 are both formed on the surface of the flexible substrate 31 that is distal from the display side 21. However, the same may also be formed on the surface of the flexible substrate 31 that is proximate to the display side 21, or it may even be that the first electrode pattern 32 and the second electrode pattern 33 are located on two different surfaces of the flexible substrate 31, e.g., the first electrode pattern 32 being formed on the surface of the flexible substrate 31 that is distal from the display side 21, and the second electrode pattern 33 being formed on the surface of the flexible substrate 31 that is proximate to the display side 21. This disclosure is not limited in this respect.

Figure 4:
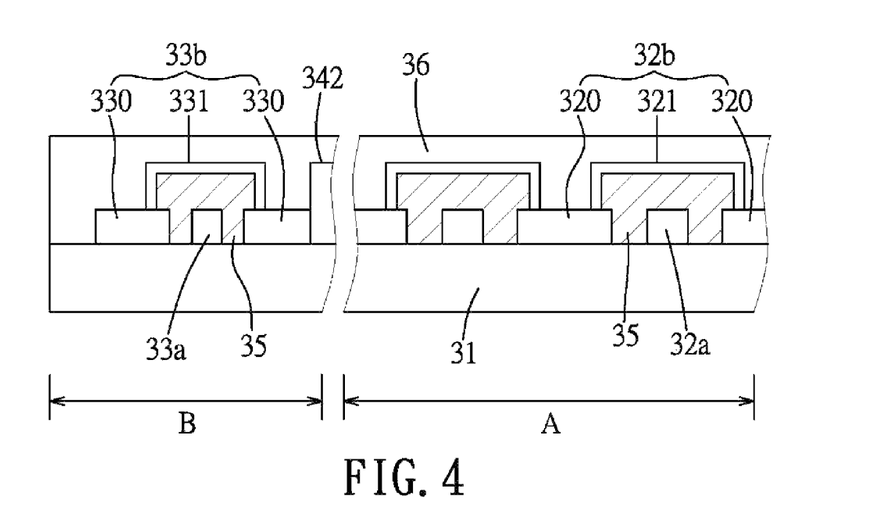
FIG. 4 is a sectional view taken from line I-I of FIG. 4.

Reference is now made to FIG. 3 and FIG. 4, where FIG. 4 is a sectional view taken along line I-I of FIG. 3. The first electrode pattern 32 is for providing touch response functionality of screen operations, and is not limited to any particular pattern. The first electrode pattern 32 includes a plurality of horizontal sensing electrodes 32a that are horizontally extending and mutually parallel, and a plurality of vertical sensing electrodes 32b that are vertically extending and mutually parallel. The horizontal sensing electrodes 32a and the vertical sensing electrodes 32b are mutually insulating by way of the insulative layer 35. In some embodiments, the horizontal sensing electrodes 32a and the vertical sensing electrodes 32b are located on the same side of the flexible substrate 31. In other embodiments not illustrated herein, the horizontal sensing electrodes 32a and the vertical sensing electrodes 32b of the first electrode pattern 32 are disposed on two sides of the flexible substrate 31, and this disclosure is not limited in this respect. Further details are omitted.

Each vertical sensing electrode 32b specifically includes a plurality of electrode units 320 that are spacedly arranged in the vertical direction, and a plurality of first bridging structures 321, each crossing between two electrode units 320. The horizontal sensing electrodes 32a and the vertically spacedly arranged electrode units 320 are manufactured through performing lithography on the same electrically conductive layer, and the material thereof may be a transparent conductive material, e.g., indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO), etc., or may also include nanometal materials, metal mesh, etc. The nano metal materials may be for example, nano silver wire, nano copper wire, carbon nanotube, etc. Each first bridging structure 321 on the other hand is fabricated through performing lithography on a trace layer. In order to maintain transparency, the first bridging structure 321 adopts the same transparent, electrically conductive material as the electrically conductive layer, and may be formed in the same procedure as the electrically conductive layer, or alternatively, in different procedures. In other embodiments, the material of the first bridging structure 321 may also include non-transparent, electrically conductive material, such as metal.

The second electrode pattern 33 is for providing touch response functionality for the touch icons 53a, 53b of the side frame 52 (e.g., return to front page, back to previous page), and is not limited to any specific pattern. In some embodiments, it is exemplified that the number and location of the second electrode patterns 33 correspond to those of the touch icons 53a, 53b, but this disclosure is not limited thereto; that is to say, the number of the second electrode pattern 33 may be one, but the area thereof is relatively larger as to correspond to all of the touch icons 53a, 53b. Taking this configuration as an example, each second electrode pattern 33 includes horizontal sensing electrodes 33a that extend horizontally, and a vertical sensing electrode 33b that extends vertically. The horizontal sensing electrodes 33a and the vertical sensing electrode 33b are mutually insulating by way of the insulative layer 35. In some embodiments, the horizontal sensing electrodes 33a and the vertical sensing electrode 33b are located on the same side of the flexible substrate. In other embodiments not illustrated herein, the horizontal sensing electrodes 33a and the vertical sensing electrode 33b of the first electrode pattern 32 are located on two sides of the flexible substrate 31. The disclosure is not limited in this respect, and further details are omitted.

The vertical sensing electrode 33b specifically includes two electrode units 330 that are spacedly arranged in the vertical direction, and a second bridging structure 331 that crosses between the two electrode units 330. Since the second electrode patterns 33 will be covered by the side frame 52, the material of the horizontal sensing electrodes 33a and the electrode units 330 is not limited to the aforementioned transparent, electrically conductive material, nano metal material, metal mesh, etc., and may also be metal. In order to reduce the chance of breakage and enhance reliability, the second bridging structure 331 of each second electrode pattern 33 preferably adopts a metal material, such as silver, aluminum, gold, copper, etc., but is not limited hereto. In terms of fabrication, if the same electrically conductive material as the first electrode pattern 32 is used as the material of the horizontal sensing electrodes 33a and the electrode units 330 of the second electrode patterns 33, the horizontal sensing electrodes 33a and the electrode units 330 of the second electrode patterns 33 may be completed in one procedure with the first electrode pattern 32, while the fabrication of the second bridging structures 331 is conducted separately. If metal is adopted as the material for the horizontal sensing electrodes 33a and the electrode units 330 of the second electrode patterns 33, then the horizontal sensing electrodes 33a and the electrode units 330 of the second electrode patterns 33 will be made in a separate procedure from the first electrode pattern 32, e.g., performing the fabrication of the second electrode patterns 33 after completing the fabrication of the first electrode pattern 32 using a transparent, electrically conductive material. However, this disclosure is not limited in this respect.

The trace structure 34 is also formed on the surface of the flexible substrate 31, and includes a plurality of contacts (pads) 341, and a plurality of traces 342 connected between the first electrode pattern 32 and the contacts 341 and between the second electrode patterns 33 and the contacts 341 for transmitting signals generated by the first electrode pattern 32 or the second electrode patterns 33. In some embodiments, the contacts 341 are located between the first electrode pattern 32 and the second electrode patterns 33. These contacts 341 and some traces 342 are substantially located in the first sub-area B1 of the second area B. The other traces 342 are located in the first area A and are arranged along the edge of the first electrode pattern 32, to be able to take shield from a shielding layer (not shown) to achieve an aesthetically appealing effect. Specific locations of these contacts 341 and the traces 342 may be adjusted based on product size or various structural designs. It should be noted herein that the size and distribution of the trace structure 34 as illustrated in FIG. 3 are for illustration purposes only, and are not drawn to scale. In fact, the occupied area is very small in proportion.

During fabrication, the trace structure 34 may be formed in the same lithography process as the formation of the second bridging structures 331 by adopting the same metal material with the second bridging structures 331, and will not add to the overall fabrication procedure. However, this disclosure is not limited in this respect.

Besides, the touch panel 3 may further include a passivation layer 36 for covering over the first electrode pattern 32, the second electrode pattern 33 and the trace structure 34, in order to prevent the first electrode pattern 32, the second electrode pattern 33 or the trace structure 34 from chemical erosion or physical damage, which affects the touch sensing functionality. The passivation layer 36 may, for example, adopt non-organic materials, such as silicon nitride, silicon oxide and silicon oxynitride, or may adopt organic materials, such as acrylic resin, or other suitable transparent materials.

As shown in FIG. 1 and FIG. 2, the protective plate 4 is glass or transparent plastic, is adhered to the touch panel 3 with a bonding layer, and is distal from the display side 21 of the display panel 2, i.e., the touch panel 3 is disposed between the protective plate 4 and the display side 21, in order to achieve the effect of protecting the touch panel 3. In other embodiments of this disclosure, the protective plate 4 can be integrally formed as one piece with the casing unit 5, in which case the bonding procedure can be omitted to simplify the fabrication process.

In some embodiments, by forming the second electrode patterns 33 on the surface of the flexible substrate 31 and corresponding in position to the first sub-area B1, and by having the first sub-area B1 bent relative to the first area A, the second electrode patterns 33 are disposed in correspondence with the side frame 52 of the casing unit 5. As such, not only is the problem of the touch keys occupying a certain area of the display zone of the prior art solved so as to achieve the design of a narrow frame, but the touch functionality is also achieved in the side frame.

Figure 5:
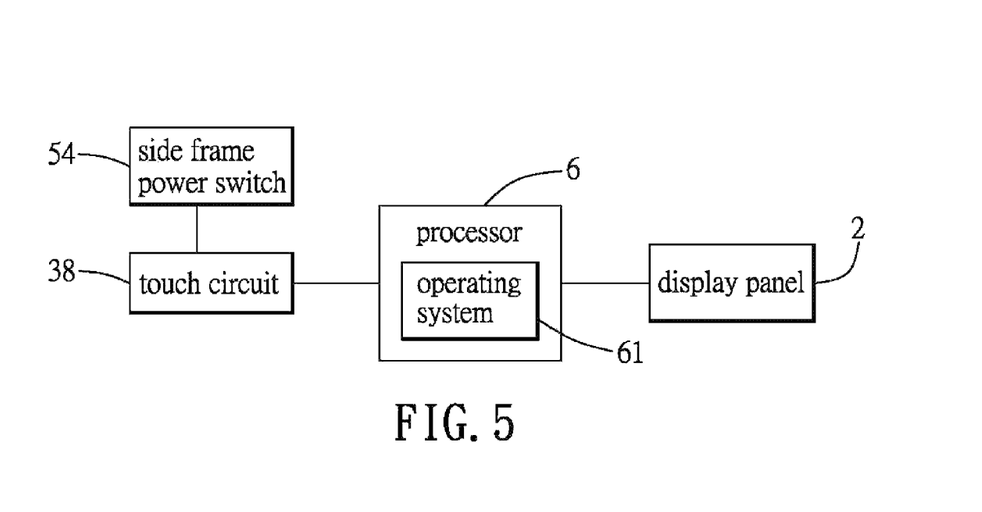
FIG. 5 is a block diagram, illustrating a power control scheme of the first embodiment.

With reference to FIG. 5, in order to prevent accidental touch of the touch icons 53a, 53b of the side frame 52, some embodiments additionally incorporate a mechanism by which the user can decide on his/her own whether to activate the touch functionality of the side frame 52. The side frame 52 is further provided with a side frame power switch 54. The second electrode patterns 33 and the traces 342 connected to the second electrode patterns 33 are independently controlled to be turned on or off by the side frame power switch 54.

This disclosure may also be designed in such a way that the second electrode patterns 33 and the traces 341 connected to the second electrode patterns 33 are co-controlled, along with the display panel 2, by the side frame power switch 54. When the side frame power switch 54 is pressed, the touch signal thus generated is transmitted to a touch circuit 38 of the touch panel 3, and is processed by the touch circuit 38 to generate a power control command to be transmitted to a processor 6 of the touch electronic device 1. An operating system (OS) 61 executed by the processor 6 then switches the display panel 2 along with the touch panel 3, such that the same are supplied with power to operate or do not operate. As such, the side frame power switch 54 can be used to control the touch icons 53a, 53b of the side frame 52, thereby achieving precise, efficient operation of the touch electronic device.

Figure 6:
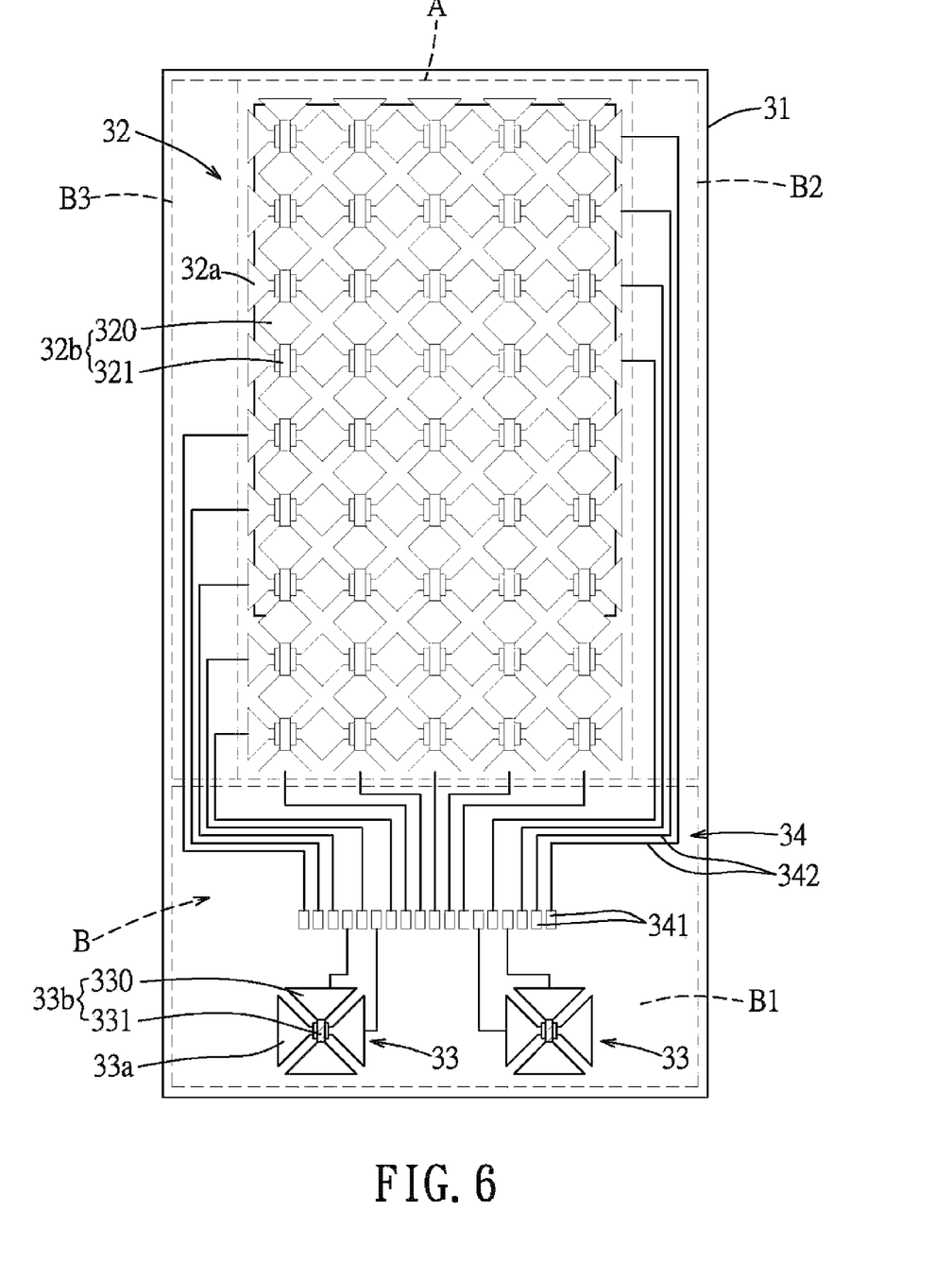
FIG. 6 is a top view, illustrating the touch panel according to a second embodiment of this disclosure when expanded and laid flat.

Reference is made to FIG. 6, which is a top view illustrating a touch panel according to various embodiments of this disclosure when expanded and laid flat. The configuration shown in FIG. 6 is essentially similar to that illustrated in FIG. 3, with the difference residing in that in some embodiments, the second area B of the flexible substrate 31 is defined to not only include the first sub-area B1 located at one side of the first area A, but also a second sub-area B2 and a third sub-area B3 located at two opposite sides of the first area A. In some embodiments, the first area A is rectangular, and the first sub-area B1 of the second area B is located at a side of the rectangle and the second sub-area B2 of the second area B is located at another side of the rectangle. Here, the trace structure 34 is formed as much on the surface of the flexible substrate 31 that corresponds in location to the first sub-area B1, the second sub-area B2 and the third sub-area B3 as is possible. As such, the trace structure 34 will correspond to the side frame 52 of the casing unit 5 (see FIG. 2), such that the touch display portion is maximized. With regard to the design of the second area B, it may be varied depending upon requirements and needs, for example, to further include a fourth sub-area. This disclosure is not limited in this aspect.

Based on the above, this configuration makes it possible for the trace structure 34 to be disposed as much on the surface of the flexible substrate 31 to correspond in location to the first sub-area B1, the second sub-area B2 and the third sub-area B3 of the second area B as possible. By making the second area B bent relative to the first area A, frameless design at three sides can be achieved, and the objects of maximizing the touch display portion and realizing the touch function at the side frame are also achieved.

Figure 7:
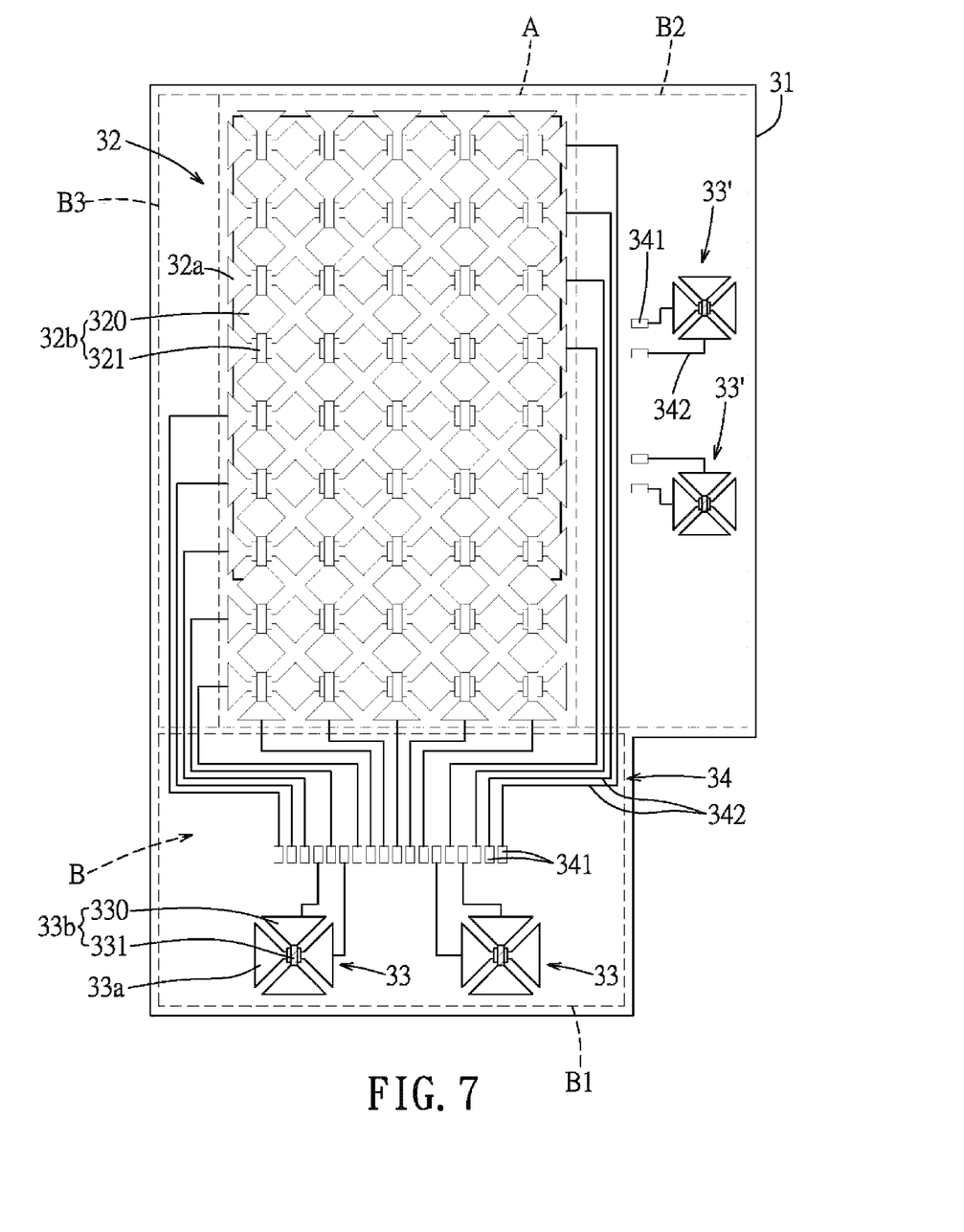
FIG. 7 is a top view, illustrating the touch panel according to a third embodiment of this disclosure when expanded and laid flat.

Reference is now made to FIG. 7, which is a top view illustrating a touch panel according to various embodiments of this disclosure when expanded and laid flat. This configuration is basically similar to that illustrated in FIG. 6, and differs therefrom in that at least a third electrode pattern 33' similar to the second electrode pattern 33 is formed on the surface of the flexible substrate 31, and corresponds in position to the second sub-area B2. In the figure, two third electrode patterns 33' for realizing the touch functionality (e.g., increasing music volume, decreasing music volume) are illustrated as an example, but this disclosure is not limited thereto. For the material of the third electrode patterns 33', reference may be made to the parts described with reference to the first electrode pattern 32 or the second electrode patterns 33, and further details will be omitted herein. It should be appreciated that in some embodiments, the side frame 52 (see FIG. 1) further includes touch icons (not shown) to correspond to the third electrode patterns 33'. As such, not only is the frameless design for three sides achieved, but two sides are provided with touch functions, fully utilizing the space of the side frame 52 and maximizing the touch display portion. In addition, the third electrode patterns 33' may also be fabricated in the same process with the first electrode pattern 32 and the second electrode patterns 33, and do not add to the overall fabrication steps.

Similarly, in some embodiments, the touch electronic device 1 of this disclosure is designed to have four sides, and even four sides all having touch icons, thereby realizing touch functionality at the four sides.

Figure 8:
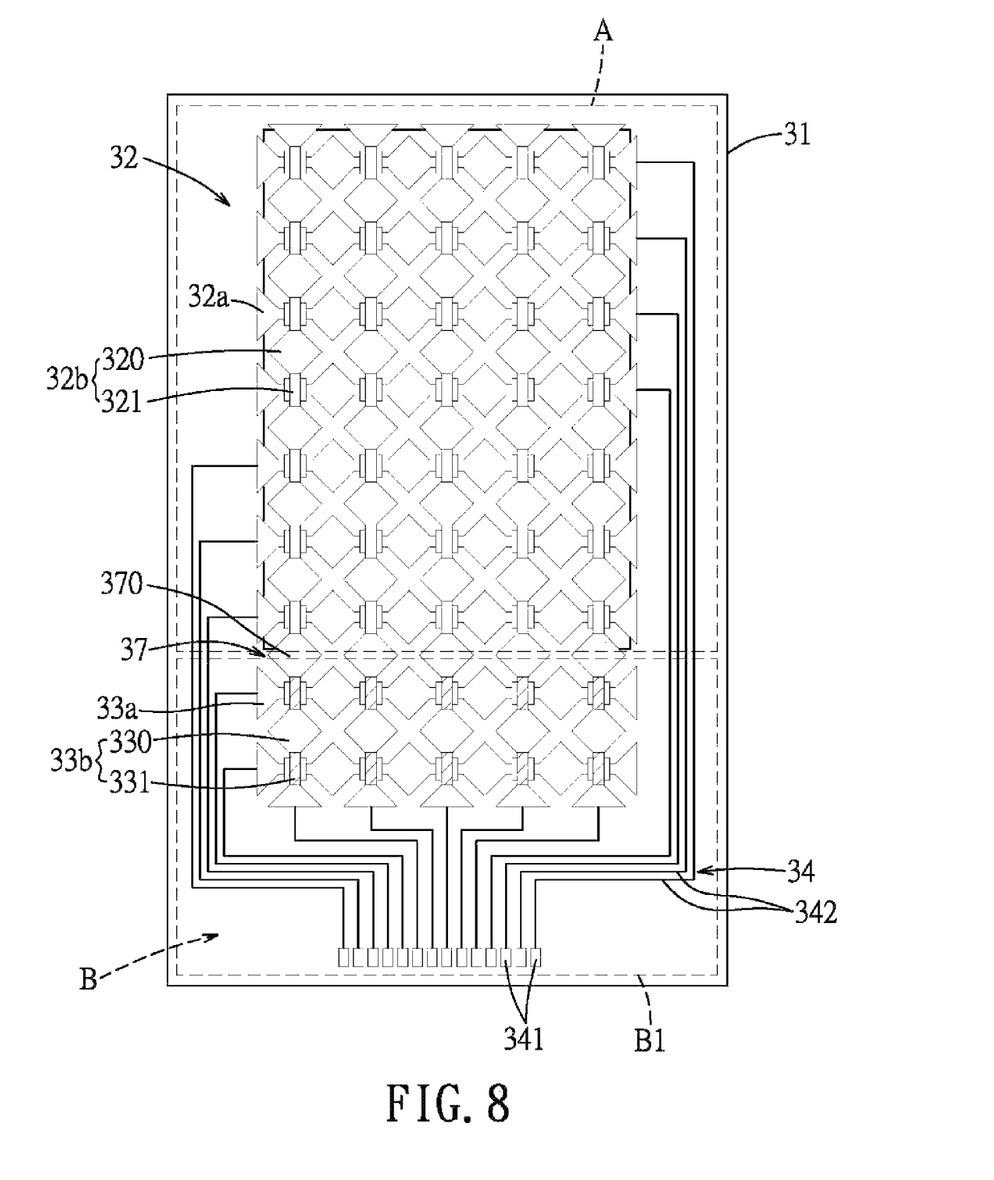
FIG. 8 is a top view, illustrating the touch panel according to a fourth embodiment of this disclosure when expanded and laid flat.

Reference is now made to FIG. 8, which is a top view illustrating a touch panel according to various embodiments of this disclosure when expanded and laid flat. This configuration mainly differs from the above configurations in that the contacts 341 are located at a side of the second electrode patterns 33 distal from the first electrode pattern 32.

In some embodiments, the second electrode patterns 33 and the first electrode pattern 32 are designed to be integral, with identical patterns, thereby simplifying the fabrication process. In addition, the first bridging structures 321 and the second bridging structures 331 can use the same or different materials, and the order of their formation is not limited and can be freely adjusted as required. Similarly, while the first sub-area B1 is illustrated in the drawing as being located at the short side as an example, it may also be designed to be at the long side.

Moreover, in order to ensure that the electrically conductive layer does not easily fracture at the bent, the touch panel 3 further includes a reinforcing structure 37. The reinforcing structure 37 is formed at the junction of the first area A and the second area B of the flexible substrate 31, and is disposed on the first electrode pattern 32 or the trace structure 34 at said junction. The reinforcing structure 37 is made from an electrically conducting metal material that has malleability and that is not easily fractured. Specifically speaking, the reinforcing structure 37 can be composed of a plurality of electrode units 370 fabricated from metal meshes, but this disclosure is not limited to this.

Figure 9:
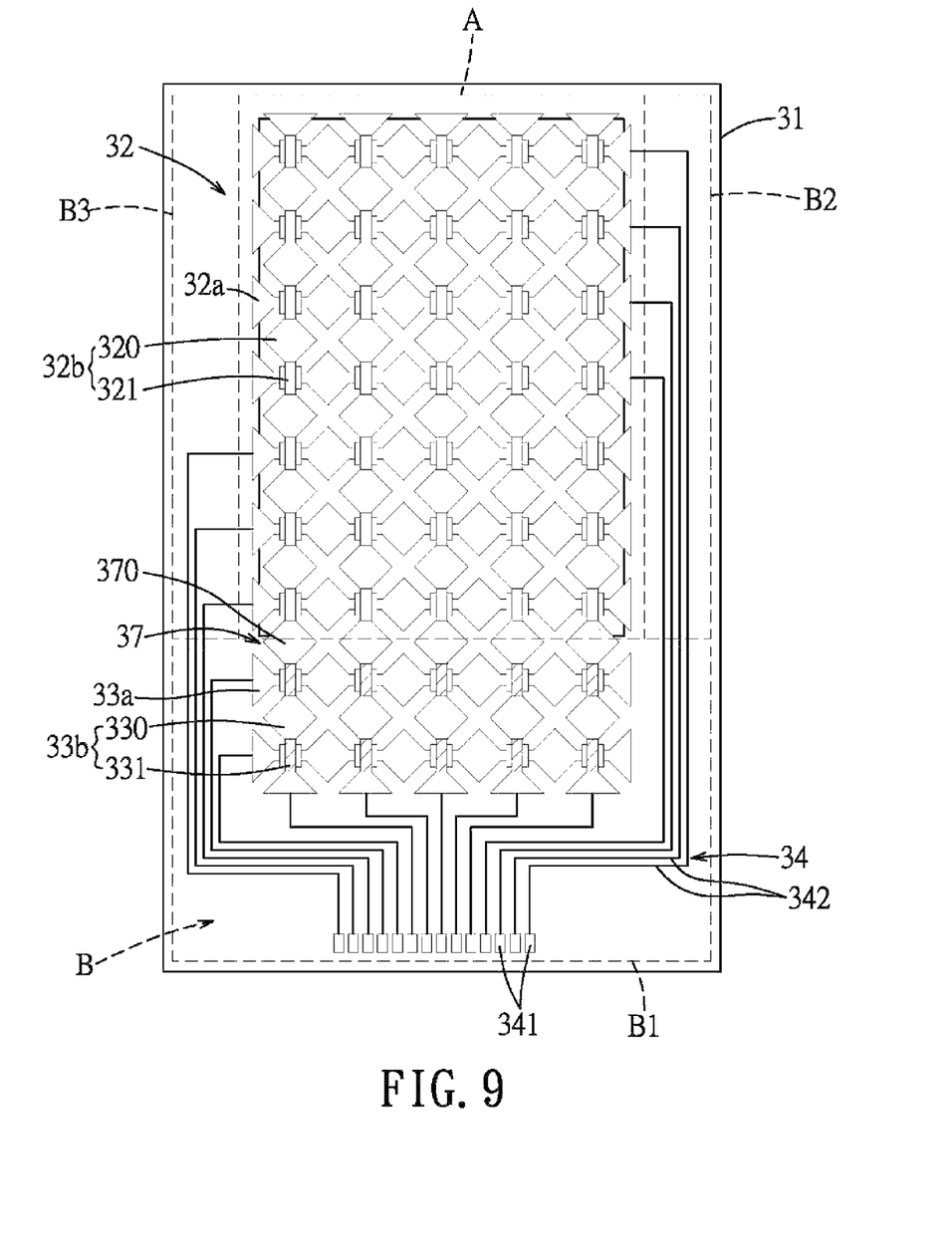
FIG. 9 is a top view, illustrating the touch panel according to a fifth embodiment of this disclosure when expanded and laid flat

Reference is now made to FIG. 9, which is a top view illustrating a touch panel according to at least one embodiment of this disclosure when expanded and laid flat. This configuration is essentially the same as that illustrated in FIG. 8, and differs therefrom in that the second area B of the flexible substrate 31 is defined to not only include the first sub-area B1 at one side of the first area A, but also include a second sub-area B2 and a third sub-area B3 at two opposite sides of the first area A. Here, the trace structure 34 is formed as much on the surface of the flexible substrate 31 that corresponds in location to the first sub-area B1, the second sub-area B2 and the third sub-area B3 as possible. As such, the trace structure 34 will correspond to the side frame 52 of the casing unit 5 (see FIG. 2), such that the touch display portion is maximized. With regard to the design of the second area B, it may be varied depending upon requirements and needs, for example, to further include a fourth sub-area. This disclosure is not limited in this aspect.

Figure 10:
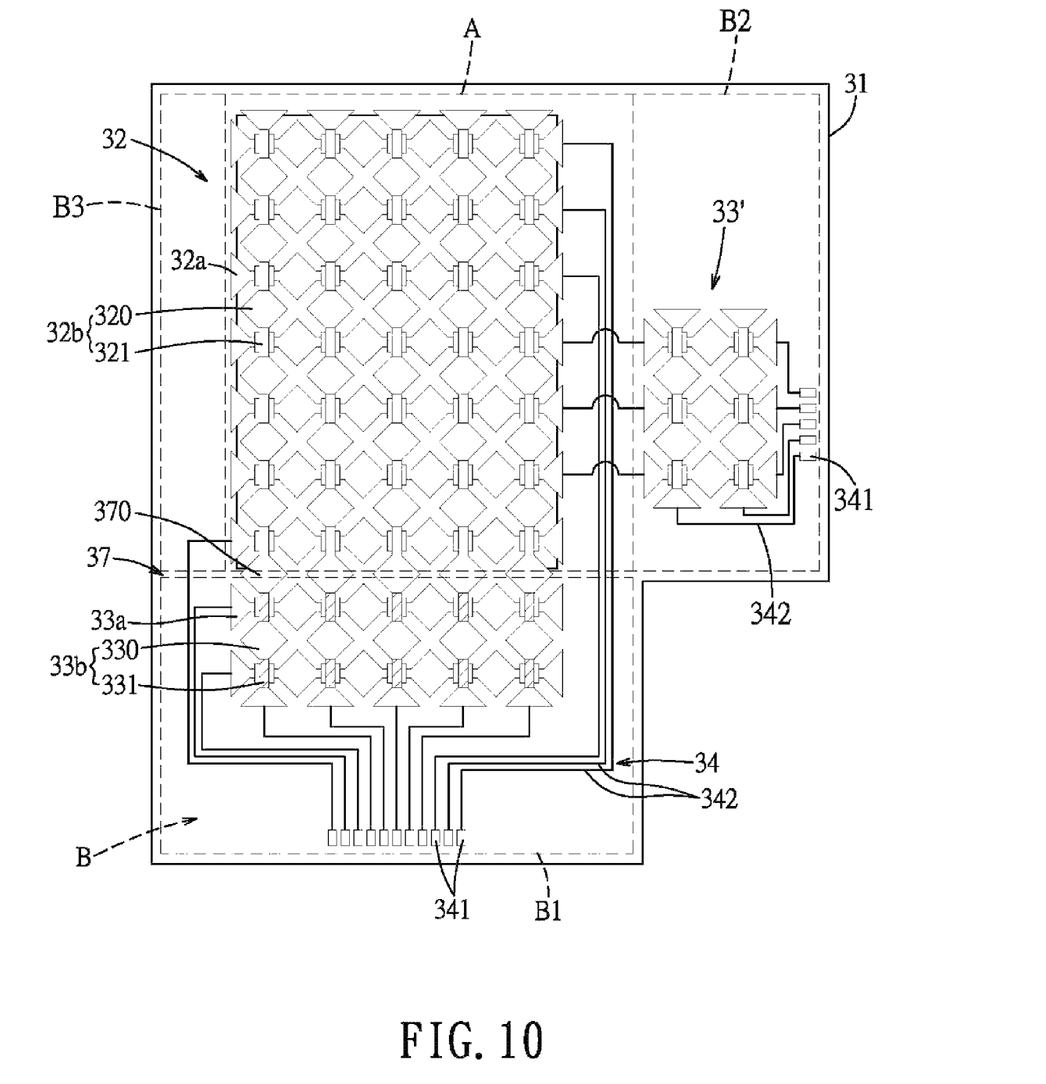
FIG. 10 is a top view, illustrating the touch panel according to a sixth embodiment of this disclosure when expanded and laid flat.

Reference is now made to FIG. 10, which is a top view illustrating a touch panel according to at least one embodiment of this disclosure when expanded and laid flat. This configuration is basically similar to that illustrated in FIG. 9, and differs therefrom in that at least a third electrode pattern 33' similar to the second electrode patterns 33 is formed on the surface of the flexible substrate 31, and corresponds in position to the second sub-area B2. In the figure, a sheet of third electrode pattern 33' for realizing different touch functions (e.g., increasing music volume, decreasing music volume) is illustrated as an example, but this disclosure is not limited thereto. For the material of the third electrode pattern 33', reference can be made to the parts described with reference to the first electrode pattern 32 or the second electrode patterns 33, and further description will be omitted herein. It should be appreciated that in this configuration, the side frame 52 (see FIG. 1) includes touch icons (not shown) that correspond to the third electrode pattern 33'. As such, not only is the frameless design for three sides achieved, but two sides are also provided with touch functions, fully utilizing the space of the side frame 52 and maximizing the touch display portion. In addition, the third electrode pattern 33' may also be fabricated in the same process with the first electrode pattern 32 and the second electrode patterns 33, and does not add to the overall fabrication steps.

Similarly, the touch electronic device 1 of this disclosure may be further designed to have four sides, even with the four sides all having touch icons, thereby realizing touch functionality at the four sides.

Figure 11:
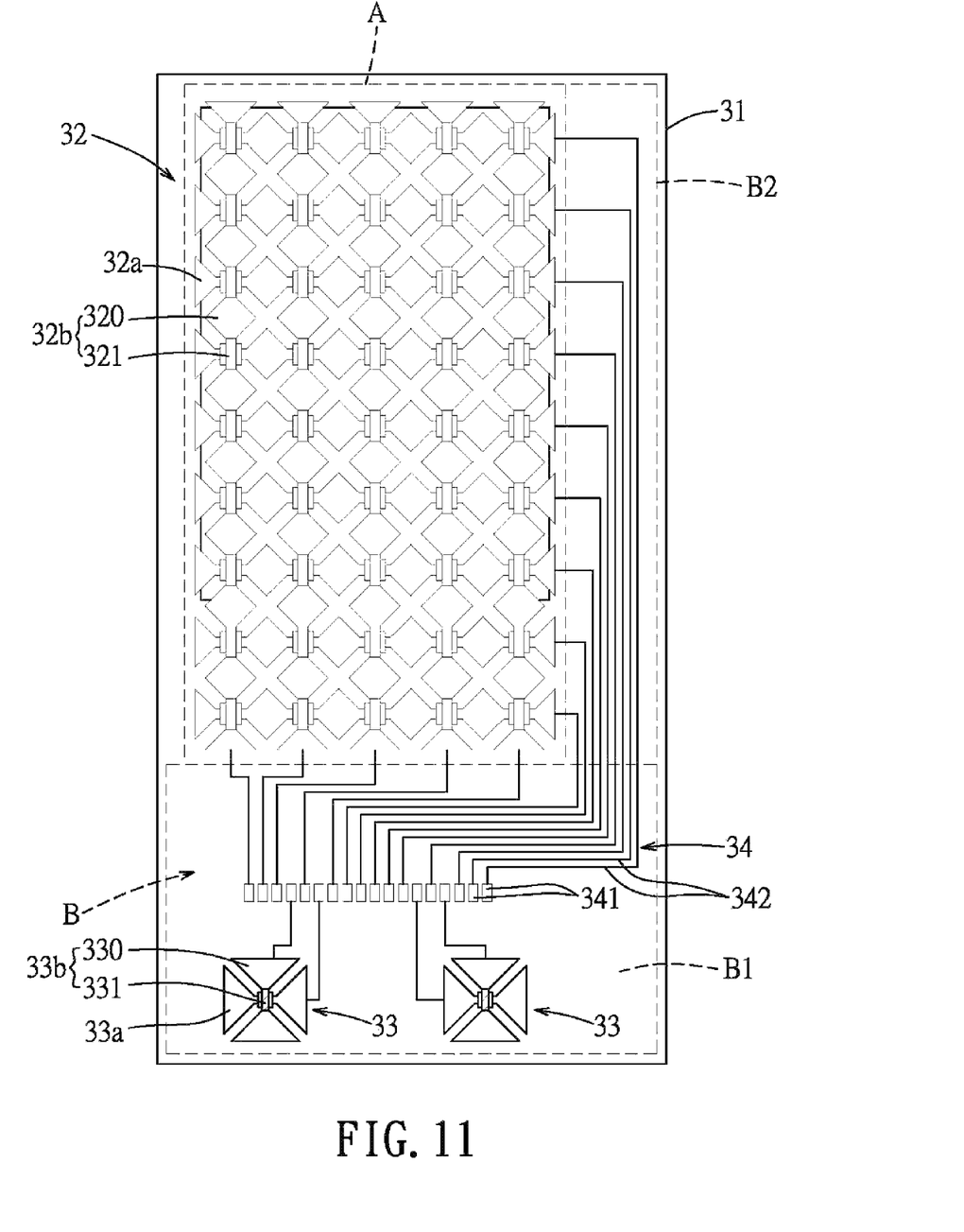
FIG. 11 is a top view, illustrating the touch panel according to a seventh embodiment of this disclosure when expanded and laid flat.

Reference is now made to FIG. 11, which is a top view illustrating a touch panel according to at least one embodiment of this disclosure when expanded and laid flat. This configuration is basically similar to that illustrated in FIG. 3, with the difference residing in that the second area B of the flexible substrate 31 is defined to not only include the first sub-area B1 located at one side of the first area A, which is rectangular, but also a second sub-area B2 located at another side of the first area A.

In summary of the above, the touch electronic device of this disclosure can utilize the flexibility of the touch panel to form the second electrode pattern(s) on the surface of the flexible substrate and corresponding in location to the second area, such that the second area is bent relative to the first area, thereby making the second electrode pattern disposed corresponding to the touch icon of the side frame of the casing unit. As such, not only can the touch display portion be maximized, but touch functionality can also be realized at the side frame. Furthermore, the trace structure can also be made to correspond in location to the second area and be bent relative to the first area, such that the trace structure corresponds to the side frame of the casing unit and it is not required to reserve tracing region in the front surface, thereby achieving frameless design, and indeed meeting the object of this disclosure.

While the present disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A touch panel configured to be mounted inside a casing unit, said casing unit including a main casing and a side frame connected to a periphery of said main casing, said side frame being provided with at least one key icon and a side frame power switch, and said touch panel comprising:
   a flexible substrate correspondingly disposed at an inner surface of said casing unit, said flexible substrate including a first area that corresponds to said main casing and a second area that corresponds to said side frame;
   a first electrode pattern formed on a surface of said flexible substrate and located at said first area;
   at least one second electrode pattern formed on said surface of said flexible substrate and located at said second area, said at least one second electrode pattern corresponding to said at least one key icon and being isolated from said first electrode pattern;
   a trace structure formed on said surface of said flexible substrate, said trace structure including a plurality of traces and a plurality of contact pads arranged between said first electrode pattern and said at least one second electrode pattern;
   said first electrode pattern connected with at least one contact pad through at least one trace, said at least one second electrode pattern connected with at least another contact pad through at least another trace and independently controlled to be turned on and off by said side frame power switch;
   a reinforcing structure composed of a plurality of electrode units fabricated from metal mesh, said reinforcing structure being formed at a junction of said first area and said second area of said flexible substrate and being disposed on said first electrode pattern or said trace structure at said junction.

2. The touch panel as claimed in claim 1, wherein said first electrode pattern includes:
   a plurality of horizontal sensing electrodes that extend horizontally and that are mutually parallel, and
   a plurality of vertical sensing electrodes that extend vertically, that are mutually parallel and that are insulated from said plurality of horizontal sensing electrodes.

3. The touch panel as claimed in claim 1, wherein said at least one second electrode pattern includes:
   at least one horizontal sensing electrode that is arranged horizontally, and
   at least one vertical sensing electrode that is arranged vertically and that is insulated from said at least one horizontal sensing electrode.

4. The touch panel as claimed in claim 1, wherein said first electrode pattern and said at least one second electrode pattern are located at a same side of said flexible substrate.

5. The touch panel as claimed in claim 1, wherein said first electrode pattern and said at least one second electrode pattern are located at different sides of said flexible substrate.

6. The touch panel as claimed in claim 1, further comprising a passivation layer disposed over said first electrode pattern, said at least one second electrode pattern and said trace structure.

7. The touch panel as claimed in claim 1, wherein:
   said first area of said flexible substrate is rectangular,
   said second area includes a first sub-area located at a side of said rectangle and a second sub-area located at another side of said rectangle,
   said at least one second electrode pattern is formed at said first sub-area, and
   said trace structure is mainly formed at said first sub-area and said second sub-area.

8. The touch panel as claimed in claim 7, further comprising at least one third electrode pattern, said at least one third electrode pattern being formed on said surface of said flexible substrate and located at said second sub-area.

9. The touch panel as claimed in claim 1, wherein said flexible substrate is made from a light transmissive material and has undergone at least one of the following surface processings: reinforcement, anti-glare or anti-bacterial.

10. A touch electronic device, comprising:
    a controller; and
    the casing unit and the touch panel as claimed in claim 1, wherein said side frame power switch communicates with said controller to turn said second electrode pattern on or off.

11. The touch electronic device as claimed in claim 10, further comprising a display panel disposed between said main casing and said touch panel.

12. The touch panel as claimed in claim 1, wherein a subset of the plurality of traces connected to said first electrode pattern are mainly located at said second area.

13. The touch panel as claimed in claim 1, wherein said first electrode pattern includes electrode units made from a first material and said at least one second electrode pattern includes electrode units made from a second material different than said first material.

14. The touch panel as claimed in claim 13, wherein said first material is transparent and said second material is non-transparent.

* * * * *